(12) United States Patent
Anderson et al.

(10) Patent No.: US 7,720,771 B1
(45) Date of Patent: May 18, 2010

(54) METHOD OF DIVIDING PAST COMPUTING INSTANCES INTO PREDICTABLE AND UNPREDICTABLE SETS AND METHOD OF PREDICTING COMPUTING VALUE

(75) Inventors: Eric Anderson, Palo Alto, CA (US); Dirk Beyer, Walnut Creek, CA (US); Ira Cohen, Sunnyvale, CA (US); Terence P. Kelly, Palo Alto, CA (US); Janet Wiener, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 190 days.

(21) Appl. No.: 11/165,810

(22) Filed: Jun. 24, 2005

(51) Int. Cl.
*G06F 15/18* (2006.01)
(52) U.S. Cl. .................................... 706/12
(58) Field of Classification Search ............ 706/12
See application file for complete search history.

(56) References Cited

U.S. PATENT DOCUMENTS 6,327,581 B1 * 12/2001 Platt ........................... 706/12
6,907,436 B2    6/2005 Ye et al.

OTHER PUBLICATIONS

T. Kelly and I. Cohen and M. Goldszmidt and K. Keeton "Inducing models of black-box storage arrays", Technical Report HPL-2004 url = "citeseer.ist.psu.edu/kelly04inducing.html" }.*

Zomaya, A.Y. Clements, M. Olariu, S. "A framework for reinforcement-based scheduling in parallel processor systems" IEEE Transactions on Parallel and Distributed Systems, Mar. 1998 vol. 9 , Issue: 3, pp. 249-260.*
Syed et al ("A study of Support Vectors on Model Independent Example Selection" KDD-1999.*
Zhao et al ("Representative Sampling for Text Classification Using Support Vector Machines" 2003).*
Liu et al ("On issues of instance selection" 2002).*
Morring et al ("Weighted Instance Typicality Search (WITS): A Nearest Neighbor Data Reduction Algorithm" 2003).*
Thomas Reinartz ("A Unifying View on Instance Selection" 2001).*
Tom Minka ("Day 33- Nearest-neighbor classification" 2001).*
Daniel Barbará et al., ADAM: A Testbed for Exploring the Use of Data Mining in Intrusion Detection, 2001, SIGMOD Record, 30(4):15-24, ACM Press, New York, NY.

(Continued)

*Primary Examiner*—David R Vincent
*Assistant Examiner*—Lut Wong

(57) ABSTRACT

An embodiment of a method of dividing past computing instances into predictable and unpredictable sets begins with a first step of a computing entity storing a training data set comprising past computing instances. Each past computing instance comprises attributes and a past computing value. In a second step, the computing entity separates the training data set into a predictable set of past computing instances and an unpredictable set of past computing instances. According to an embodiment, a method of predicting a computing value begins with the first and second steps. The method of predicting the computing value continues with a third step of the computing entity forming a predictor from the predictable set of past computing instances. In a fourth step, the computing entity applies the predictor to a pending computing instance that meets a predictability test to determine a predicted value for the pending computing instance.

18 Claims, 2 Drawing Sheets

OTHER PUBLICATIONS

Carla E. Brodley, et al., Knowledge Discovery and Data Mining, Amercian Scienticst, 1999, 87(1):54-61, Sigma Xi, The Scientific Research Society, Research Triangle Park, NC.

Yoav Freund et al., Experiments with a New Boosting Algorithm, Machine Learning: Proceedings of the Thirteenth International Conference, 1996, pp. 148-156, Elsevier B.V. Amsterdam, Netherlands.

David J. Hand et al., Data Mining for Fun and Profit, Statistical Science, 2000, 15(2):111-131, Institute of Mathematical Statistics, Beachwood, OH.

Terence Kelly et al., Inducing Models of Black-Box Storage Arrays, HP Technical Report HPL-2004-108, Jun. 25, 2004, Hewlett-Packard Development Company, L.P., Palo Alto, CA.

Bohuslav Rychlik et al., Efficient and Accurate Value Prediction Using Dynamic Classification, 1998, Pittsburgh, PA.

Ian H. Witten et al., Data Mining: Practical Machine Learning Tools and Techniques with Java Implementations, 2000, Academic Press, San Diego, CA.

Ying Yang et al., Dealing with Predictive-but-Unpredictable Attributes in Noisy Data Sources, Sep. 20, 2004, Burlington VT.

* cited by examiner

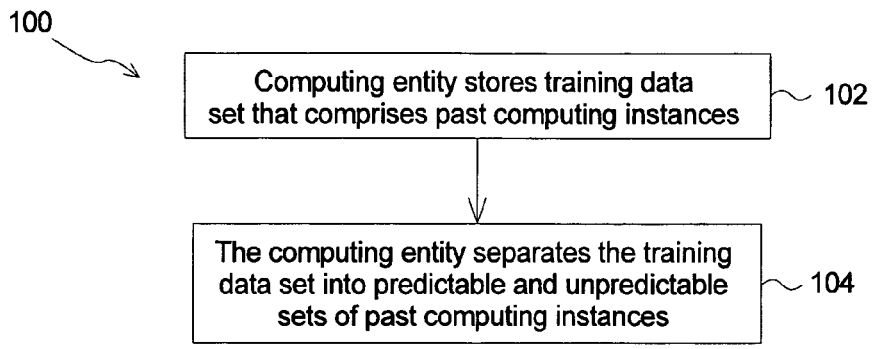
FIG. 1
| Table 1 | | | | | | |
|---|---|---|---|---|---|---|
| Training Data Set | | | | | | |
| Past Instance | Attribute Data Set *A* | | | | | Computing Value |
| | *A*(1) | *A*(2) | *A*(3) | ... | *A*(n) | |
| c(1) | a(1, 1) | a(1, 2) | a(1, 3) | ... | a(1, n) | V(1) |
| c(2) | a(2, 1) | a(2, 2) | a(2, 3) | ... | a(2, n) | V(2) |
| ⋮ | ⋮ | ⋮ | ⋮ | ... | ⋮ | ⋮ |
| c(m) | a(m, 1) | a(m, 2) | a(m, 3) | ... | a(m, n) | V(m) |
FIG. 2
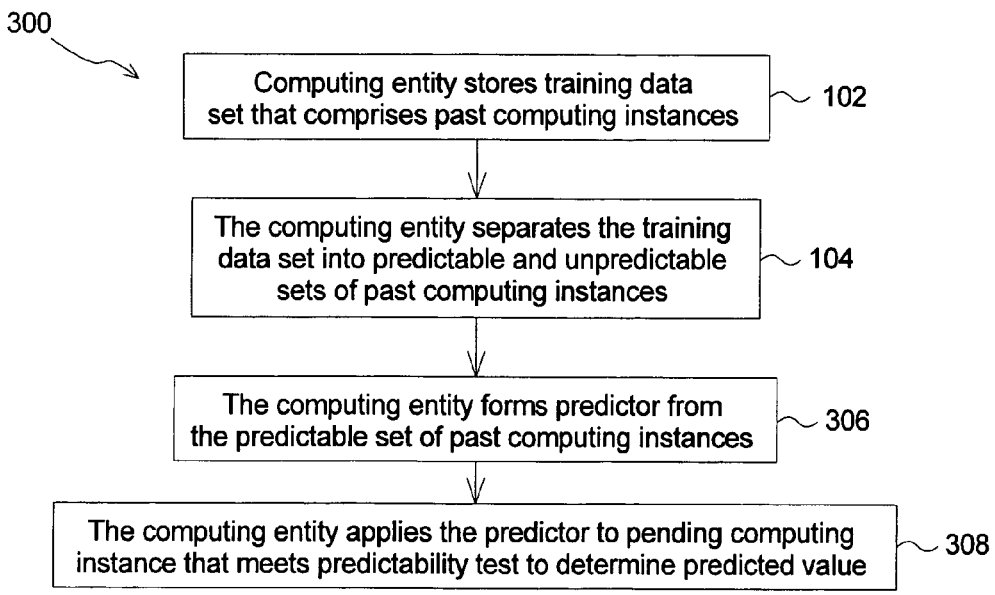
FIG. 3

METHOD OF DIVIDING PAST COMPUTING INSTANCES INTO PREDICTABLE AND UNPREDICTABLE SETS AND METHOD OF PREDICTING COMPUTING VALUE

FIELD OF THE INVENTION

The present invention relates to the field of computing. More particularly, the present invention relates to the field of computing where dividing past computing instances into predictable and unpredictable sets would be beneficial.

BACKGROUND OF THE INVENTION

Machine learning is a technique that examines a set of instances each having an associated value or class to learn a concept. The set of instances and the associated values are often referred to as a training data set. Having learned the concept, it may then be applied to a new instance to predict a value or class for the new instance. The technique is referred to as "machine" learning because it employs a computer (i.e., a machine).

Machine learning techniques such as regression, classification trees, and decision trees are applied to an entire training data set. Applying these techniques to an entire training data set may make it more difficult to predict values. A standard technique used in data mining and statistics is to eliminate outliers from a training data set. The outliers are determined by identifying unusual values in the training data set. The outliers are then removed from the training data set. Such a technique does not address predictability.

SUMMARY OF THE INVENTION

According to an embodiment, the present invention is a method of dividing past computing instances into predictable and unpredictable sets. According to another embodiment, the present invention is a method of predicting a computing value.

According to an embodiment, a method of dividing past computing instances into predictable and unpredictable sets begins with a first step of a computing entity storing a training data set comprising past computing instances. Each past computing instance comprises attributes and a past computing value. In a second step, the computing entity separates the training data set into a predictable set of past computing instances and an unpredictable set of past computing instances.

According to an embodiment, a method of predicting a computing value begins with a first step of a computing entity storing a training data set comprising past computing instances. Each past computing instance comprises attributes and a past computing value. In a second step, the computing entity separates the training data set into a predictable set of past computing instances and an unpredictable set of past computing instances. The method continues with a third step of the computing entity forming a predictor from the predictable set of past computing instances. In a fourth step, the computing entity applies the predictor to a pending computing instance that meets a predictability test to determine a predicted value for the pending computing instance.

According to an embodiment, a method of predicting a computing value predicts a scheduling value. An embodiment of the method of predicting the scheduling value begins with a first step of a computing entity storing a training data set. The training data set comprises previously-executed processor operation instances. Each previously-executed processor operation instance comprises attributes and a past scheduling value. In a second step, the computing entity separates the training data set into a predictable set of previously-executed processor operation instances and an unpredictable set of previously-executed processor operation instances. The method continues with a third step of the computing entity forming a predictor from the predictable set of previously-executed processor operation instances. In a fourth step, the computing entity applies the predictor to a to-be-scheduled processor operation that meets a predictability test to determine the scheduling value for the to-be-scheduled processor operation.

These and other aspects of the present invention are described in more detail herein.

BRIEF DESCRIPTION OF THE DRAWINGS

The present invention is described with respect to particular exemplary embodiments thereof and reference is accordingly made to the drawings in which:

FIG. 1 illustrates an embodiment of a method of dividing past computing instances into predictable and unpredictable sets of the present invention as a flow chart;

FIG. 2 provides an embodiment of a table of a training data set in accordance with an embodiment of the present invention;

FIG. 3 illustrates an embodiment of a method of predicting a computing value of the present invention as a flow chart.

DETAILED DESCRIPTION OF A PREFERRED EMBODIMENT

Figure 4:
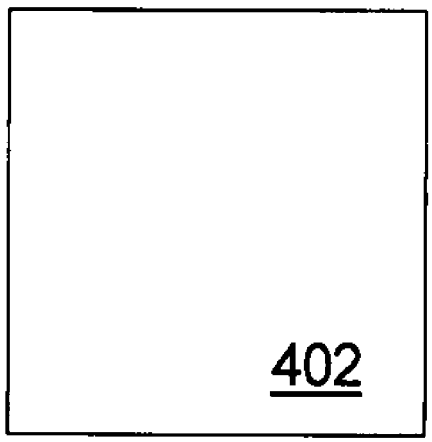
FIG. 4 illustrates a computing entity in accordance with an embodiment of the present invention.
Figure 4:
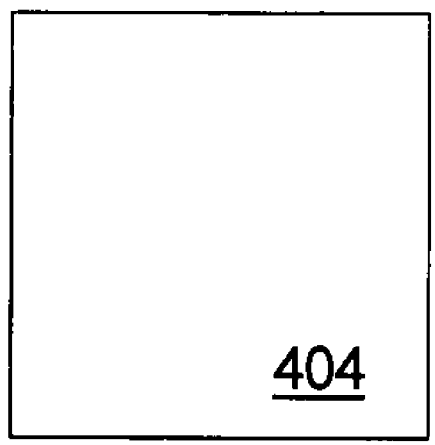

According to an embodiment, the present invention is a method of dividing past computing instances into predictable and unpredictable sets. Embodiments of the method of dividing the past computing instances into the predictable and unpredictable sets have a wide range of applications within the field of computing. For example, the past computing instances may be previously executed processor operations (e.g., tasks or jobs). Or, for example, the past computing instances may be other past computing instances such as storage requests.

According to another embodiment, the present invention is a method of predicting a computing value. Embodiments of the method of predicting the computing value have a wide range of applications within the field of computing. For example, the computing value may be a predicted runtime value related to a to-be-scheduled processor operation (e.g., a task or a job). Or, for example, the computing value may be another computing value related to another computing instance such as a response time for a storage request.

An embodiment of a method of dividing past computing instances into predictable and unpredictable sets of the present invention is illustrated as a flow chart in FIG. 1. The method begins with a first step of a computing entity 402 storing a training data set that comprises past computing instances. The computing entity may be a computer or another computing entity such as a plurality of computers coupled by a network. Each past computing instance comprises attributes and a past computing value. A computer readable medium 404 comprises computer code for implementing methods of the present invention.

The past computing instances may be previously-executed processor operations that were executed on one or more processors. The previously-executed processor operations include tasks and jobs where a job includes one or more tasks. For example, the previously-executed processor operations may be a number of single task jobs or a number of jobs that include multi-task jobs. Or, for example, the previously-executed processor operations may be a number of tasks that include tasks from a plurality of multi-task jobs. Alternatively, the past computing instances may be other past computing instances such as past storage requests of a storage device.

If the past computing instances are previously-executed processor operations, the attributes may be a project identifier, one or more computer processing operation types, one or more computer processing task types, a user or a user group, one or more input metrics, one or more output metrics, one or more queue lengths, or a combination thereof. If the past computing instances are previously-executed processor operations, the past computing value may be a resource usage, an execution time, a processing time, a critical path length, a total processing time, a number of inputs, a number of outputs, a number of page faults, or a combination thereof. The critical path length is the amount of time to process a job given an unlimited number of processors. The total processing time is the amount of time to process a job given a single processor.

For example, the previously-executed processor operations may be previously executed computer animation jobs such as brief excerpts from a computer-animated film that were processed in a multi-processor computing environment. Typically, each of the brief excerpts is processed in a series of stages that must be processed in a particular order. Each stage typically includes a plurality of tasks that may be executed in parallel. For example, the series of stages may begin with simulation of physical movement followed by model baking, then frame rendering, and concluding with film clip assembly.

If the past computing instances are past storage requests (i.e., past read requests, past write requests, or a combination thereof), the attributes may be a requested object size, number of pending requests, pending request sizes, a locality of reference characteristic, storage device configuration characteristics, or a combination thereof. If the past computing instances are past storage requests, the past computing value may be a past response time for the past storage request.

The training data set may be collected into a table (e.g., as a data structure stored in memory). For example, the training data set may be collected into Table 1, which is provided as FIG. 2. Table 1 has three main sections: Past computing instances, attribute data sets A, and past computing values. The attribute data sets are further divided into first through nth attribute categories of $A(1), A(2), \ldots, A(n)$. Reading across the first line of tabular data of Table 1, a past computing instance $c(1)$ has attributes $a(1,1), a(1,2), a(1,3), \ldots, a(1,n)$ and a past computing value $V(1)$. It may be observed that Table 1 applies to any type of computing instance. Therefore, Table 1 is applicable to any type of computing attributes and any type of computing values.

Numeric categories of attributes and past computing values may be "discretized" so that all attributes and past computing values are provided as classifications. To "discretize" is to convert numeric values into classifications by numeric range. For example, in an instantiation for computer animation processing, one of the categories may be frame count (i.e., the number of frames processed in an animation processing job). The frame count category may be discretized by grouping frame counts in count lots of 100. For example, a first frame class may be a frame count less than or equal to 100 frames, a second frame class may be a frame count of greater than 100 frames and less than or equal to 200 frames, and so forth. Some numeric categories might be sufficiently grouped so that they may be used as classifications without further discretizing. Also, strings may be converted into numbers by assigning a unique identifier to each string value or by groups as described relative to discretizing.

In a second step 104 (FIG. 1), the computing entity separates the training data set into a predictable set of past computing instances and an unpredictable set of past computing instances. In an embodiment, the second step 104 includes forming a predictability classifier and applying the predictability classifier to the training data set. For example, the predictability classifier may be selected from a probability classifier, a neural network, a support vector machine, a regressor, a multi-variate linear regression predictor, and a multi-variate non-linear regression predictor.

An embodiment of the probability classifier is a Bayesian classifier (e.g., a naive-Bayes classifier). Bayesian classifiers employ Bayes rule that states that the probability of a hypothesis H given evidence E is the sum of the product of the conditional probability of the evidence E given the hypothesis H and the probability of the hypothesis H divided by the probability of the evidence E. Bayes rule may be given by equation (1).

$$P(H|E) = \frac{P(E|H) \cdot P(H)}{P(E)} \quad (1)$$

Here, the hypothesis H may be whether a particular past computing instance has a predictable computing value class. The predictable computing value class is the class having higher probabilities.

An embodiment of an artificial neural network performs a function mapping of attributes to class values, which is estimated from the training data set or a portion of it. Artificial neural networks include nodes that are coupled by a network. An artificial neural network may be trained by adaptively updating synaptic weights that characterize the strength of connections between nodes in the network. The synaptic weights are updated according to the information extracted from new training patterns. Usually, optimal synaptic weights are obtained by minimizing or maximizing certain "energy" functions. For example, a least-squares error between an actual computing value and a predicted computing value may be minimized.

An embodiment of a support vector machine is similar to the neural network but uses a different optimization function for finding the mapping between attributes and class values. Support vector machine classifiers and regressors learn a maximum margin classifier or regression that separates the class groups for classification or fits the actual value, by optimizing a quadratic equation of an inner product of the training instances defined by a specified kernel function.

An embodiment of a multi-variate linear regression predictor employs a mapping between the attribute and the computed value, which is modeled using a linear equation. The parameters of the linear equation (i.e., the coefficients of the linear equation) may be estimated using the training instances and a score (e.g., a mean squared error).

An embodiment of a multi-variate non-linear regression classifier employs a mapping between the attributes and the computing value, which is modeled using a non-linear equation. The parameters of the non-linear function are estimated using the training instances and optimizing a score (e.g., a mean squared error).

A number of techniques may be used to form and apply the predictability classifier. In a first technique of forming and applying the predictability classifier, the predictability classifier is trained on a portion of the training data set. For example, the predictability classifier may be trained on half of the training data set. The predictability classifier is then applied to a remainder of the training data set (e.g., the other half of the training data set) to provide predictability results for the remainder of the training data set. Following this, a distribution of an absolute prediction error for the predictability results is determined. Then, a top percentile (e.g., the top 5 percentile) of the distribution is identified as at least a portion of the unpredictable set of past computing instances. The first technique then iteratively forms a reduced training data set that includes the training data set less a currently determined portion of the unpredictable set of past computing instances, trains the predictability classifier on a portion of the reduced training data set, applies the predictability classifier to a remainder of the reduced training data set, determines the distribution of the absolute prediction error for the remainder of the reduced training data set, and identifies the top percentile of the distribution as at least an additional portion of the unpredictable set of past computing instances.

In a second technique of forming and applying the predictability classifier, the predictability classifier is trained on a portion of the training data set. Following this, the predictability classifier is applied to a remainder of the training data set. Next, instances that have a predicted error that exceeds a threshold fraction (e.g., 50% or 100%) of an actual value are identified as members of the unpredictable set of past computing instances. The second technique then iteratively forms a reduced training data set that includes the training data set less currently determined members of the unpredictable set of past computing instances, trains the predictability classifier on a portion of the reduced training data set, applies the predictability classifier to a remainder of the reduced training data set, and identifies other instances that have the predicted error that exceeds the threshold fraction of the actual value as additional members of the unpredictable set of past computing instances.

In a third technique of forming and applying the predictability classifier, the predictability classifier is formed from the training data set (e.g., the entire training data set). For each past computing instance of the training data set, an error of the predictability classifier is determined. For example, if the predicted value is continuous numeric value, the error of the predictor may be the squared error for the continuous numeric value. Or, for example, if the predicted value is a classification, the error may be zero or one, which corresponds to an accurate prediction or an inaccurate prediction, respectively. For each past computing instance, an error weight relative to an overall error is determined. For example, if the error is high, the error weight is high. Until a new overall error reaches a stable value, the third technique iteratively forms a new predictability classifier from the past computing instances with each past computing instance weighted by the error weight, determines an error of the new predictability classifier for each past computing instance, and determines a new error weight relative to a new overall error for each past computing instance. For each past computing instance that has a most recent error weight that exceeds a threshold error weight, the third technique classifies the past computing instance as unpredictable.

In another embodiment, the second step 104 includes identifying one or more unpredictable groups of the past computing instances. A particular technique for identifying the one or more predictable groups of the past computing instances may include partitioning the past computing instances into groups. Each group has similar feature vectors or identical feature vectors. The particular technique then determines a distribution of computing values for each group. Following this, the one or more unpredictable groups are identified. The unpredictable groups may have a distribution of computing values with a standard deviation that exceeds a threshold value. The unpredictable groups contain the unpredictable set of past computing instances.

Techniques for identifying one or more unpredictable sets may be combined to define an unpredictable set as the union, intersection, or a weighted combination of the unpredictable sets determined by the techniques.

An embodiment of a method of predicting a computing value of the present invention is illustrated as a flow chart in FIG. 3. The method 300 comprises the first and second steps, 102 and 104, and third and fourth steps, 306 and 308. In the first step 102, a computing entity stores a training data set that comprises past computing instances. In the second step 104, the computing entity separates the training data set into a predictable set of past computing instances and an unpredictable set of past computing instances. The first and second steps, 102 and 104, are discussed in more detail above relative to an embodiment of the method of dividing past computing instances into predictable and unpredictable sets (i.e., the method 100, FIG. 1).

The method 300 continues with the third step 306 of the computing entity forming a predictor from the predictable set of past computing instances. The predictor may employ a classification technique or a regression technique. A classification technique finds a mapping between the attributes and a set of class values for the computing value of interest. Classifiers can be described as probability models (e.g., Bayesian networks) or other non-probabilistic models such as artificial neural networks and support vector machines. A regression technique finds a mapping between the attributes and a real valued computing value of interest. Regression techniques can be described as linear regression between the attributes and the computing value, non-linear regression.

In the fourth step 308 (FIG. 3), the computing entity applies the predictor to a pending computing instance that meets a predictability test to determine a predicted value for the pending computing instance. The predicted value may be a class value or a numeric value. The predictability test may include applying a most recent version of the predictability classifier to the pending computing instance (e.g., the most recent version of the predictability classifier may be the most recent version of the predictability classifier for the first, second, or third technique of forming and applying the predictability classifier, which is discussed above under the second step 102). The predictability test may include determining whether the pending computing instance has a pending feature vector that falls within one or more unpredictable groups of computing instances (e.g., the unpredictable groups of the particular technique of identifying groups of unpredictable instances, which is discussed above under the second step 102).

The method 300 may include applying the predictor to additional pending computing instances that meet the predictability test. The method 300 may include identifying other pending computing instances that do not meet the predictability test and attaching an un-predictable label to each of the other pending computing instances. A rough predicted value may be estimated for each of the other pending computing instances.

The training data set may be updated with computing instances as they are processed. Also, older computing instances may be retired from the training data set as newer computing instances are added. The method 300 may be re-executed iteratively until a stable predictor is found.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of predicting a computing value comprising the steps of:
   at least one computer:
      storing a training data set comprising past computing instances that include previously-executed processor operations, each past computing instance comprising attributes and a past computing value;
      separating the training data set into a predictable set of past computing instances and an unpredictable set of past computing instances, wherein separating the training data set into the predictable set and unpredictable set comprises:
         determining indications of error based on applying a predictability classifier to the training data set;
         using the indications of error to separate the training data set into the predictable set and the unpredictable set, wherein the unpredictable set is identified based on one of:
            identifying a predetermined percentile of the distribution of indications of error, and
            identifying indications of error that have a predetermined relation to a threshold;
      forming a predictor from the predictable set of past computing instances; and
      applying the predictor to a pending computing instance that meets a predictability test to determine a predicted value for the pending computing instance, wherein the predictability test includes applying a version of the predictability classifier to the pending computing instance.

2. The method of claim 1 wherein the attributes are selected from a project identifier, one or more computer processing operation types, one or more computer processing task types, a user or a user group, one or more input metrics, one or more output metrics, one or more queue lengths, or a combination thereof.

3. The method of claim 1 wherein the past computing value is at least one value selected from a resource usage, an execution time, a processing time, a critical path length, a total processing time, a number of inputs, a number of outputs, or a number page faults.

4. The method of claim 1 wherein the predictability classifier is selected from a probability classifier, a neural network, a support vector machine, a regression predictor, a multi-variate linear regression predictor, and a multi-variate non-linear regression predictor.

5. The method of claim 1, further comprising:
   training the predictability classifier on a portion of the training data;
   applying the predictability classifier to a remainder of the training data set;
   determining the indications of error that make up a distribution of an absolute prediction error;
   identifying a top percentile of the distribution as at least a portion of the unpredictable set of past computing instances; and
   iteratively:
      forming a reduced training data set that includes the training data set less a currently determined portion of the unpredictable set of past computing instances;
      training the predictability classifier on a portion of the reduced training data set;
      applying the predictability classifier to a remainder of the reduced training data set;
      determining the distribution of the absolute prediction error for the remainder of the reduced training data set; and
      identifying the top percentile of the distribution as at least an additional portion of the unpredictable set of past computing instances.

6. The method of claim 1, further comprising:
   training the predictability classifier on a portion of the training data set;
   applying the predictability classifier to a remainder of the training data set, wherein the determined indications of error comprise predicted errors, wherein the threshold is a threshold fraction;
   identifying past computing instances that have a predicted error that exceeds the threshold fraction of an actual value as members of the unpredictable set of past computing instances; and
   iteratively:
      forming a reduced training data set that includes the training data set less currently determined members of the unpredictable set of past computing instances;
      training the predictability classifier on a portion of the reduced training data set;
      applying the predictability classifier to a remainder of the reduced training data set; and
      identifying other instances that have the predicted error that exceeds the threshold fraction of the actual value as additional members of the unpredictable set of past computing instances.

7. The method of claim 1, wherein the threshold is a threshold error weight, the method further comprising:
   wherein determining the indications of error comprises determining an error of the predictability classifier for each past computing instance of the training data set;
   for each past computing instance, determining an error weight relative to an overall error;
   until a new overall error reaches a stable value, iteratively:
      forming a new predictability classifier from the past computing instances with each past computing instance weighted by the error weight;
      for each past computing instance, determining an error of the new predictability classifier; and
      for each past computing instance, determining a new error weight relative to a new overall error; and
      for each past computing instance having a most recent error weight that exceeds the threshold error weight, classifying the past computing instance as unpredictable.

8. The method of claim 1 wherein the predictability test includes applying a most recent version of the predictability classifier to the pending computing instance.

9. The method of claim 1 wherein the predictor employs a technique selected from a classification technique, a regression technique, a probability model.

10. The method of claim 1 wherein the predicted value is selected from a class value and a numeric value.

11. The method of claim 1 further comprising applying the predictor to additional pending computing instances that meet the predictability test.

12. The method of claim 1 further comprising identifying other pending computing instances that do not meet the predictability test.

13. The method of claim 12 further comprising attaching an unpredictable label to each of the other pending computing instances.

14. The method of claim 13 further comprising estimating a rough predicted value for each of the other pending computing instances.

15. A computer comprising computer code, which when executed by the computer, implements a method of predicting a computing value, the method of predicting the computing value comprising the steps of:

storing a training data set comprising past computing instances that include previously-executed processor operations, each past computing instance comprising attributes and a past computing value;

separating the training data set into a predictable set of past computing instances and an unpredictable set of past computing instances, wherein separating the training data set into the predictable set and unpredictable set comprises:

determining indications of error based on applying a predictability classifier to the training data set;

using the indications of error to separate the training data set into the predictable set and the unpredictable set, wherein the unpredictable set is identified based on one of:

identifying a predetermined percentile of the distribution of indications of error, and identifying indications of error that have a predetermined relation to a threshold;

forming a predictor from the predictable set of past computing instances; and applying the predictor to a pending computing instance that meets a predictability test to determine a predicted value for the pending computing instance, wherein the predictability test includes applying a version of the predictability classifier to the pending computing instance.

16. The computer of claim 15, wherein the computer code when executed by the computer implements the method that further comprises:

training the predictability classifier using a first portion of the training data set; and applying the trained predictability classifier to a second portion of the training data set, wherein the indications of error are determined based on applying the trained predictability classifier to the second portion of the training data set.

17. The computer of claim 16, wherein the indications of error comprise a distribution of prediction error, and wherein a top percentile of the distribution is identified as at least a portion of the unpredictable set.

18. The computer of claim 16, wherein the threshold is a threshold fraction, wherein the indications of error comprise predicted errors, wherein the computer code when executed by the computer implements the method that further comprises:

identifying past computing instances that have a predicted error that exceeds the threshold fraction as members of the unpredictable set.

\* \* \* \* \*